US000001317H

United States Statutory Invention Registration [19]

[11] Reg. Number: H1317

Ng

[43] Published: Jun. 7, 1994

[54] RING DAMPER FOR STRUCTUREBORNE NOISE SUPPRESSION IN PIPING SYSTEMS

[75] Inventor: Kam W. Ng, Barrington, R.I.

[73] Assignee: The United States of America as represented by the Secretary of the Navy, Washington, D.C.

[21] Appl. No.: 592,035

[22] Filed: Oct. 3, 1990

[51] Int. Cl.[5] ..... F16L 11/00; G10K 11/00

[52] U.S. Cl. ..... 181/207; 181/296

[58] Field of Search ..... 138/103, 110, 178, 26; 181/207, 208; 60/322; 16/108, 109

[56] References Cited

U.S. PATENT DOCUMENTS

| | | | |
|---|---|---|---|
| 650,290 | 5/1900 | Wirt | 181/207 |
| 3,134,611 | 5/1964 | Iversen | 138/110 |
| 3,160,549 | 12/1964 | Caldwell et al. | 181/207 |
| 3,856,107 | 12/1974 | Rabett | 181/207 |
| 3,876,034 | 4/1975 | Antonini | 181/208 |
| 4,190,131 | 2/1980 | Robinson | 181/207 |
| 4,404,992 | 9/1983 | Sasaki | 138/178 |
| 4,425,980 | 1/1984 | Miles | 181/207 |
| 4,444,403 | 4/1984 | Morris | 138/110 |
| 4,778,028 | 10/1988 | Staley | 181/208 |
| 4,789,028 | 12/1988 | Gowda et al. | 138/173 |
| 4,962,826 | 10/1990 | House | 60/322 |

*Primary Examiner*—Bernarr E. Gregory

*Attorney, Agent, or Firm*—Michael J. McGowan; Prithvi C. Lall

[57] ABSTRACT

A ring damper for reducing vibration and structureborne noise propagation in piping systems, comprising a metal ring that is clamped circumferentially around the outer surface of the pipe or duct, said ring defining an annular chamber or cavity that is stuffed with a combination of damping materials.

9 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RING DAMPER FOR STRUCTUREBORNE NOISE SUPPRESSION IN PIPING SYSTEMS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1.) Field of the Invention

The present invention relates to means for suppressing vibration and structureborne noise propagation in piping systems.

(2.) Description of the Prior Art

It has been found that flow-induced noise and vibration in piping systems or any other cylindrical structures results primarily from the coincidence of bending waves in the wall of the pipe structure and from internal acoustic modes. In order to reduce this vibration and structureborne noise, a number of techniques involving a combination of axial and circumferential stiffeners have been utilized. One such technique is known as constrained layer damping in which the pipe, duct or cylindrical shell is wrapped with an elastomeric material over which is wrapped a metallic sheet material, the two layers being held in place by means of a series of axially spaced steel bands. Another existing technique is known as stave damping-in which the pipe is once again wrapped with an elastomeric material, said layer then being covered with a plurality of elongated metal staves extending axially along the pipe, the assembly then being held in place by a series of axially spaced steel bands. A further technique, known as the tuned absorber method, is actually similar to stave damping except that the elongated metal staves are in spaced relation to each other.

Other techniques comprise the use of high damping alloys, i.e., the pipe or duct is actually constructed of an alloy that inherently exhibits damping characteristics. Still another technique utilizes composite materials wherein the pipe or duct is covered with wound carbon fibers, over which there is provided a coating of carbon impregnated resin.

Although all of the above techniques are somewhat effective for their intended purpose, they nevertheless have serious disadvantages. For example, constrained layer damping, stave damping, tuned absorber, and the use of high damping alloys are costly, bulky, and heavy, and although the use of composite materials is not as heavy and bulky, it is difficult to use this technique, as it is with all of the others, on ducts or pipes that do not have a constant diameter. In other words, none of these prior art techniques are effectively usable where the pipe or duct has an irregular surface, such as a plurality of different diameters caused by steps or shoulders along the length of the pipe. Also, all of these prior art techniques provide a uniform damping along the entire length of the pipe, whereas it is obviously more desirable to be able to specifically locate damping means at the dominant axial wave locations of the pipe, i.e., the specific areas along the length of the pipe where damping is most required.

SUMMARY OF THE INVENTION

Accordingly, it is a general purpose and object of the present invention to provide a means for reducing structureborne noise in piping systems that exhibits relatively high internal damping characteristics, and that is applicable to any cylindrical structure regardless of its surface configuration, i.e., that is applicable to pipes or ducts having a plurality of different diameters.

Another object is the provision of damping means for reducing structureborne noise in piping systems that is easy and inexpensive to install, but yet is highly efficient in use.

A further object is the provision of damping means of the character described wherein said damping means may be located at selected areas along the length of the pipe or duct where noise and vibration suppression is most required.

Still another object is the provision of damping means that is lighter in weight and less bulky than most of the conventional techniques heretofore used.

These objects are accomplished in the present invention by providing one or more ring dampers that extend circumferentially around the pipe or duct, preferably at axially spaced locations along the pipe length. Basically, the ring damper of the present invention is a metallic ring that surrounds the pipe in clamping engagement therewith, said ring being configured so as to define an annular cavity extending around the pipe, which cavity is stuffed with a combination of damping materials. The combination further comprises one or more layers of damping material extending around the pipe surface, over which the ring damper is mounted in pressurized engagement therewith.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
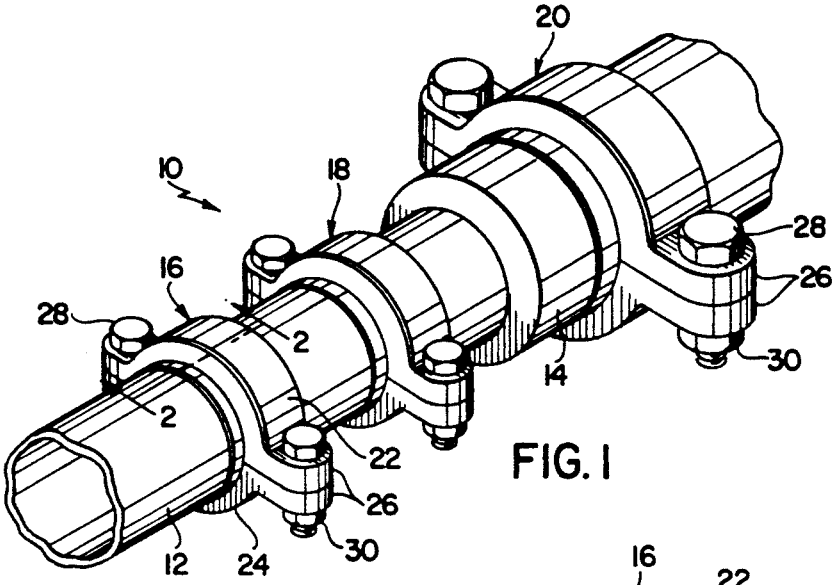
FIG. 1 shows a fragmentary perspective view of a length of multidiameter pipe having the ring dampers of the present invention mounted thereon.

Referring now to the drawings, and more particularly FIG. 1, there is shown generally at 10 a piping system comprising a first pipe portion 12 having a first diameter and a second, larger pipe portion 14, the diameter of which is larger than that of portion 12. In order to suppress and reduce flow-induced noise and vibration in the piping system 10, resulting primarily from the coincidence of bending waves in the structure (pipe wall) and from internal acoustic modes, ring dampers shown generally at 16, 18 and 20 are provided. Each of the ring dampers 16, 18 and 20 are of the same basic construction, comprising a pair of semicircular ring portions 22, 24, each having outwardly extending flanges or ears 26 at their terminal ends. Terminal ends 26 have apertures therein adapted to receive a clamping bolt 28 and nut 30 whereby tightening of the nuts 30 on the bolts 28 causes the semicylindrical ring portions 22, 24 to clampingly engage the pipe. It will be understood that ring dampers 16 and 18 are identical, while ring damper 20 differs only in that it is mounted on the larger diameter portion of the pipe, thus necessitating that the semicylindrical portions thereof be slightly larger so as to be able to completely encircle the larger pipe diameter.

Figure 2:
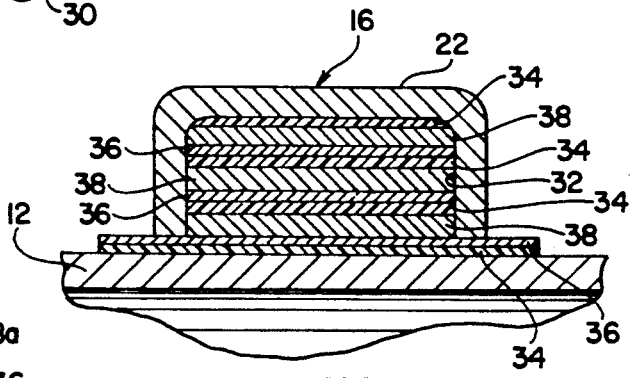
FIG. 2 shows an enlarged cross sectional view taken along line 2—2 of FIG. 1.

As will be seen most clearly in FIG. 2, semicylindrical section 22 of ring damper 16 is of generally hollow, rectangular configuration, defining an annular cavity or chamber 32 that extends completely around the pipe circumference. As will be noted in FIG. 2, ring damper 16 is not clamped directly onto pipe 12, but rather the latter is first covered with one or more layers of damping material before receiving the ring damper thereon in clamping engagement. Specifically, a first layer of elastomeric or rubber-like material 34 is wrapped around the pipe 12, and then a layer of metallic material 36 is wrapped thereover. It has been found that a material known as ISODAMP (trademark of EAR Division of Cabot Corporation, material data sheet MDS-19) is particularly effective for the layer 34, while a material known as VACROSIL-010 (trademark of Vacuumschmelze G.M.B.H. (VAC) as more fully set forth in Naval Postgraduate School Report NPS 69-87-002 entitled "Damping Behavior of an Fe-Cr-Mo alloy; Strain-Dependence and Heat treatment Effects, December 1986) is particularly effective as the metallic layer 36. It is important that the elastomeric layer be wrapped directly around the pipe surface and that the metallic layer then be wrapped over the elastomeric layer. The ring damper 16 is then positioned over layer 36 and the bolts ,28 tightened so that the ring damper makes firm pressurized engagement therewith.

In order to achieve the desired damping effect, it is important that cavity 32 be stuffed with damping materials. As shown in FIG. 2, the damping materials stuffed within cavity 32 comprise a plurality of lead sheets or layers 38 which have sandwiched therebetween abutting layers of ISODAMP and VACROSIL. It has been found that by sandwiching the VACROSIL plates and the lead sheets between the ISODAMP layers, maximum structural damping and isolation characteristics are achieved. By utilizing known testing techniques, it is possible to determine the dominant axial wave locations along the length of the pipe, i.e., the locations where damping is most required. Once these locations are determined, the ring dampers are clampingly mounted at said locations as above described. Actual testing has shown that the use of ring dampers in accordance with the present invention greatly attenuates the vibration amplitudes, sometimes by as much as 40 dB when compared to bare pipe resonant responses.

Figure 3:
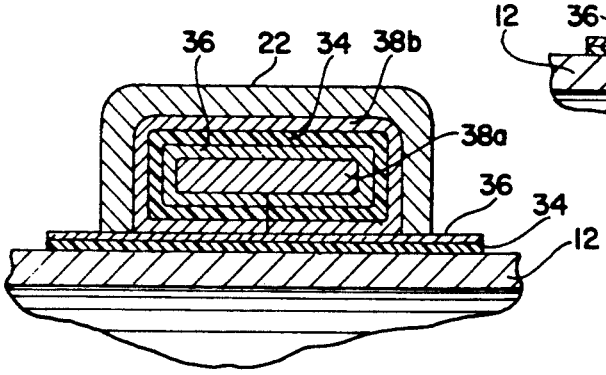
FIGS. 3, 4 and 5 show enlarged sectional views similar to FIG. 2 illustrating possible different orientations of damping materials within the ring.
Figure 4:
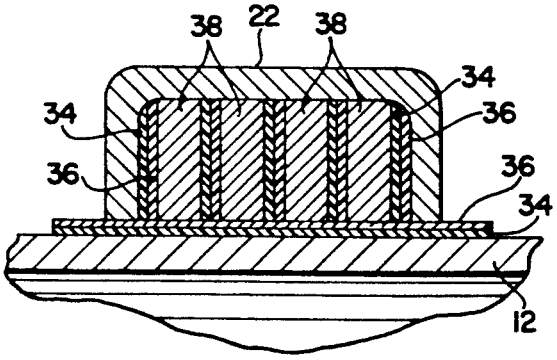
Figure 5:
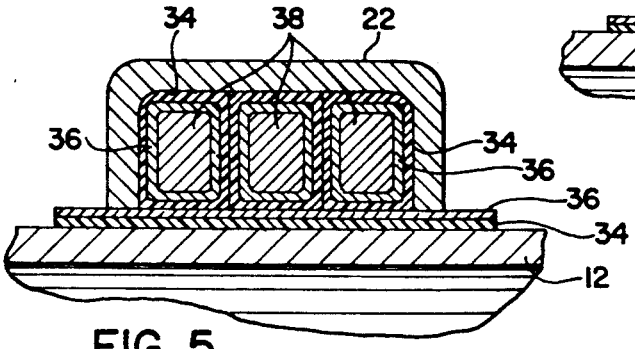

FIGS. 3, 4 and 5 show the same ring damper but with different arrangements of ISODAMP, VACROSIL and lead plates within the ring damper cavity. Thus, in FIG. 3, the stuffing within the cavity comprises a center lead portion 38*a* surrounded by VACROSIL 36, which in turn is surrounded by a layer of ISODAMP 34 around which extends an outer layer of lead plate 38*b* whereby the ISODAMP and VACROSIL is sandwiched between the inner and outer lead portions. In FIG. 4, the damping materials extend vertically rather than horizontally as in FIG. 2, while in FIG. 5 there are a plurality of lead portions 38 each surrounded by a layer of VACROSIL 36, each VACROSIL layer in turn being surrounded by a layer of ISODAMP 34. In all embodiments it will be noted that layers of VACROSIL and ISODAMP are sandwiched between lead portions or plates, and in all embodiments a layer of ISODAMP surrounds the pipe with a layer of VACROSIL thereover, and then the ring dampers are clampingly secured around the VACROSIL layer.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In combination with a pipe, a ring damper for reducing vibration and structureborne noise propagation in said pipe, comprising a metallic ring member adapted to be clamped around the pipe circumference at a preselection dominant axial wave location, said ring member and said pipe circumference defining a cavity extending annularly around the pipe circumference, said cavity being filled with dampimg material.

2. In the ring damper of claim 1, said damping material comprising a combination of elastomeric sheet, metallic sheet, and lead sheet.

3. The ring damper of claim 2 further characterized in that a first layer of said elastomeric sheet is wrapped around the pipe circumference at the location where the ring damper is mounted, a second layer of said metallic sheet is wrapped around said first layer, said ring member being in clamping engagement with said second layer.

4. An elongated pipe having a plurality of damping means clamped thereon, being axially spaced at preselected dominant axial wave locations, for reducing vibration and structureborne noise propagation caused by fluid flow therethrough, each said damping means comprising a layer of damping material extending around the circumference of said pipe, a metallic ring member clampingly engaging said damping layer, said ring member being configured so as to, in cooperation with said pipe circumference, define an annular cavity extending around said pipe circumference in communication with said damping layer, and damping material stuffed within said cavity so as to completely fill same.

5. The combination of claim 4 further characterized in that each said ring member is clamped onto a discrete damping layer, wherein there is a plurality of axially spaced damping layers on said pipe, each having one of said ring members clamped therearound.

6. The combination of claim 4 further characterized in that said damping layer comprises a first elastomeric sheet wrapped around said pipe, and a second metallic sheet wrapped around said first sheet.

7. In the combination of claim 6, said damping material stuffed within said cavity comprising a combination of elastomeric, metallic, and lead sheet materials.

8. In the combination of claim 4, each said ring member further comprising a pair of semi-circular mating sections clamped to each other so as to extend completely around said damping layer in pressurized engagement therewith.

9. The combination of claim 4 further characterized in that the cross sectional shape of said annular cavity is rectangular.

* * * * *